US011244791B2

(12) United States Patent
Nguyen et al.

(10) Patent No.: US 11,244,791 B2
(45) Date of Patent: *Feb. 8, 2022

(54) RECHARGEABLE POWER SOURCE FOR MOBILE DEVICES WHICH INCLUDES AN ULTRACAPACITOR

(71) Applicant: OXCION LIMITED, Wellington (GB)

(72) Inventors: Cattien V. Nguyen, San Jose, CA (US); You Li, Sunnyvale, CA (US); Darrell L. Niemann, Santa Clara, CA (US); Hoang Nguyen Ly, San Jose, CA (US); Philip A. Kraus, San Jose, CA (US)

(73) Assignee: Oxcion Limited, Wellington (GB)

( * ) Notice: Subject to any disclaimer, the term of this patent is extended or adjusted under 35 U.S.C. 154(b) by 22 days.

This patent is subject to a terminal disclaimer.

(21) Appl. No.: 16/046,464

(22) Filed: Jul. 26, 2018

(65) Prior Publication Data

US 2018/0342357 A1  Nov. 29, 2018

Related U.S. Application Data

(63) Continuation of application No. 14/265,289, filed on Apr. 29, 2014, now abandoned.

(Continued)

(51) Int. Cl.
*H01G 11/04* (2013.01)
*H01G 11/36* (2013.01)
(Continued)

(52) U.S. Cl.
CPC .............. *H01G 11/04* (2013.01); *H01G 11/36* (2013.01); *H01G 11/46* (2013.01); *B82Y 30/00* (2013.01);
(Continued)

(58) Field of Classification Search
CPC ........ H01G 11/04; H01G 11/36; H01G 11/46; H01G 11/28
See application file for complete search history.

(56) References Cited

U.S. PATENT DOCUMENTS 6,232,706 B1   5/2001  Dai et al.
6,700,352 B1 * 3/2004  Elliott ................... H02J 7/0013
                                                          320/130
(Continued)

FOREIGN PATENT DOCUMENTS

CN    102354604 A    2/2012
JP    H11290116 A   10/1999
(Continued)

OTHER PUBLICATIONS

Q.-H. Yang, H.-M. Cheng, Chapter 12—Carbon nanotubes: Surface, porosity, and related applications, Editor(s): Liming Dai, Carbon Nanotechnology, Elsevier, 2006, pp. 323-359, ISBN 9780444518552, https://doi.org/10.1016/B978-044451855-2/50015-2. (Year: 2006).*

*Primary Examiner* — David M Sinclair
(74) *Attorney, Agent, or Firm* — Hodgson Russ LLP

(57) ABSTRACT

Provided herein is a rechargeable power source that can be quickly charged and used for charging mobile and cordless devices. The power source includes an ultracapacitor which comprises a composite structure including, for example open graphene structures or graphene nanoribbons attached to an oxide layer. The oxide layer is on a metal foil surface. The oxide layer includes more than one metal atom.

22 Claims, 9 Drawing Sheets

1-Side CNT Deposition 300

Related U.S. Application Data

(60) Provisional application No. 61/817,819, filed on Apr. 30, 2013.

(51) Int. Cl.
 *H01G 11/28* (2013.01)
 *H01G 11/46* (2013.01)
 *B82Y 30/00* (2011.01)

(52) U.S. Cl.
 CPC .............. *H01G 11/28* (2013.01); *Y02E 60/13* (2013.01); *Y10S 977/742* (2013.01)

(56) References Cited

U.S. PATENT DOCUMENTS

| | | | |
|---|---|---|---|
| 6,836,097 | B2 | 12/2004 | Turner et al. |
| 7,019,492 | B1 | 3/2006 | Baker et al. |
| 7,986,509 | B2 | 7/2011 | Seymour et al. |
| 9,065,287 | B2 | 6/2015 | Petersen et al. |
| 10,546,698 | B2 * | 1/2020 | Nguyen ................ H01M 4/133 |
| 2002/0113573 | A1 * | 8/2002 | Woodroffe ............. F02B 63/04 |
| | | | 320/115 |
| 2003/0035982 | A1 | 2/2003 | Ryu et al. |
| 2004/0036449 | A1 | 2/2004 | Bean et al. |
| 2007/0279011 | A1 * | 12/2007 | Jones ...................... H01G 9/14 |
| | | | 320/167 |
| 2009/0034158 | A1 | 2/2009 | Sasaki |
| 2009/0183770 | A1 * | 7/2009 | Nguyen ................. H01J 1/304 |
| | | | 136/256 |
| 2009/0246625 | A1 * | 10/2009 | Lu ......................... H01M 4/625 |
| | | | 429/207 |
| 2010/0035093 | A1 | 2/2010 | Ruoff et al. |
| 2010/0105834 | A1 | 4/2010 | Tour et al. |
| 2010/0178564 | A1 | 7/2010 | Asari et al. |
| 2011/0117974 | A1 | 5/2011 | Spitalnik et al. |
| 2011/0157770 | A1 | 6/2011 | Nguyen et al. |
| 2012/0026643 | A1 | 2/2012 | Yu et al. |
| 2012/0279516 | A1 | 11/2012 | Bouix et al. |
| 2013/0026978 | A1 | 1/2013 | Cooley et al. |
| 2013/0052489 | A1 | 2/2013 | Zhamu et al. |
| 2013/0052547 | A1 | 2/2013 | Ogino et al. |
| 2013/0065050 | A1 | 3/2013 | Chen et al. |
| 2013/0148265 | A1 | 6/2013 | Okuno et al. |
| 2013/0212409 | A1 | 8/2013 | Zhamu et al. |
| 2013/0230751 | A1 | 9/2013 | Shaw |
| 2013/0307464 | A1 * | 11/2013 | Zhu ........................... H02J 7/35 |
| | | | 320/101 |
| 2014/0226260 | A1 * | 8/2014 | Gardner ................ H01G 11/56 |
| | | | 361/502 |

FOREIGN PATENT DOCUMENTS

| | | |
|---|---|---|
| JP | 2003092234 A | 3/2003 |
| JP | 2003299255 A | 10/2003 |
| JP | 2007262509 A | 10/2007 |
| JP | 2012515448 A | 7/2012 |
| KR | 10-2012-0026303 A | 3/2012 |
| WO | 2006112698 A2 | 10/2006 |
| WO | 2010022164 | 2/2010 |
| WO | 2012129690 A1 | 10/2012 |

* cited by examiner

RECHARGEABLE POWER SOURCE FOR MOBILE DEVICES WHICH INCLUDES AN ULTRACAPACITOR

This application is a continuation of U.S. application Ser. No. 14/265,289, filed on Apr. 29, 2014, which claims priority under 35 U.S.C. § 119(e) to U.S. Provisional Application Ser. No. 61/817,819, filed Apr. 30, 2013, the disclosures of which are hereby incorporated by reference in their entirety.

FIELD

Provided herein is a rechargeable power source that can be quickly charged and used for charging mobile devices. The power source includes an ultracapacitor which comprises a composite structure including carbon nanotubes attached to an oxide layer.

BACKGROUND

Energy storage devices are increasingly important in powering a wide variety of devices such as, for example, motor vehicles, cellular telephones, computers, etc. However, a significant problem with currently available energy storage devices is the slow rate of charging of these mobile devices. Typically, currently available energy storage devices with sufficient energy density require several hours for full recharging of mobile devices.

Accordingly, what is needed is a power source with sufficient energy density that quickly charges mobile devices.

SUMMARY

The present invention satisfies these and other needs by providing, in one aspect, a rechargeable power source which quickly charges mobile devices. The rechargeable power source includes at least one ultracapacitor as the energy storage unit in the power source, in which at least one electrode in the ultracapacitor has a composite structure. The composite structure includes a metal foil with thickness less than 500 µm, a metal oxide layer disposed on the metal foil surface and carbon nanotubes disposed on the metal oxide layer, where the metal oxide layer thickness is less than 100 nm and where the metal oxide layer is comprised of more than one metal atom.

In some embodiments, at least one of the metal atoms is a catalyst for carbon nanotube growth. In other embodiments, the carbon nanotubes are in electrical ohmic contact with the metal foil.

DETAILED DESCRIPTION

Definitions

Figure 1:
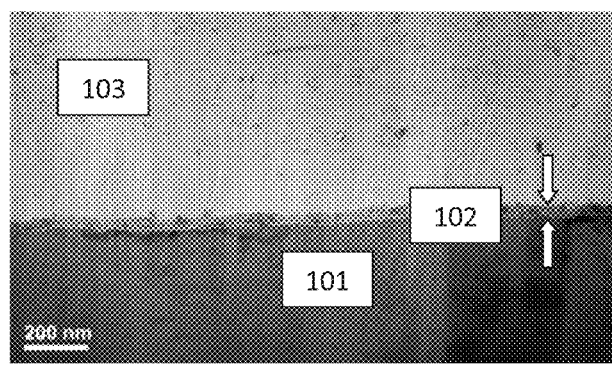
FIG. 1 illustrates carbon nanotubes attached to an oxide layer dispersed on a metal surface at 200 nm resolution as visualized by transmission electron microscopy.

Unless defined otherwise, all technical and scientific terms used herein have the same meaning as is commonly understood by one of ordinary skill in the art to which this invention belongs. In the event that there is a plurality of definitions for a term herein, those in this section prevail unless stated otherwise.

As used herein "AC plug" refers to a two- or three-prong male plug for connection with 2 or 3 prong AC electricity outlets that is commonly found in wall mounted receptacles.

As used herein "carbon nanotubes" refers to allotropes of carbon with a cylindrical structure. Carbon nanotubes may have defects such as inclusion of C5 and/or C7 ring structures, such that the carbon nanotube is not straight; and may have contain coiled structures; and may contain randomly distributed defected sites in the C—C bonding arrangement. Carbon nanotubes may contain one or more concentric cylindrical layers.

As used herein "ultracapacitors" includes electrochemical capacitors, electrical double layer capacitors, and supercapacitors.

As used herein "chemical vapor deposition" refers to plasma-enhanced chemical vapor deposition or thermal chemical vapor deposition.

As used herein "plasma-enhanced chemical vapor deposition" refers to the use of plasma (e.g., glow discharge) to transform a hydrocarbon gas mixture into excited species which deposit carbon nanotubes on a surface.

As used herein "thermal chemical vapor deposition" refers to the thermal decomposition of hydrocarbon vapor in the presence of a catalyst which may be used to deposit carbon nanotubes on a surface.

As used herein "physical vapor deposition" refers to vacuum deposition methods used to deposit thin films by condensation of a vaporized of desired film material onto film materials and includes techniques such as cathodic arc deposition, electron beam deposition, evaporative deposition, pulsed laser deposition and sputter deposition.

As used herein "unzipping" refers to process of full or partial opening the tubular structures of carbon nanotubes to increase total surface area of the composite structure. The unzipping can be accomplished by any oxidation processes. The carbon nanotubes in the composite structure can be fully unzipped or be partially unzipped, depending on the condition of the unzipping process as well as the nature of the defective sites of the carbon nanotubes in the composite structure.

Mobile devices, such as cell phones, smart phones, tablets, and laptop computers are ubiquitous with the advent of wireless networks and the internet. Also, mobile devices can be a cordless power tool such as an electric saw, an electric drill, an electric screw driver, etc. Currently batteries are the main technology and long charging time is the norm. Ultracapacitors have the ability to charge at a much faster rate than a typical rechargeable battery because of the higher power density of an ultracapacitor. Typical charging time for a battery in a cell phone is between about 2-3 hours. In contrast, an ultracapacitor used in a cell phone can be charged in tens of seconds to a few minutes. Accordingly, replacing batteries in mobile devices with high power density ultracapacitors can dramatically reduce charging time. Using the higher energy density ultracapacitor technologies described herein maintains the small size and portability of mobile devices while concurrently allowing for rapid recharging.

In one aspect, a power source is provided that is rechargeable and fast charging, where at least one ultracapacitor is used as the energy storage unit in the power source and where the ultracapacitor comprises vertically aligned carbon nanotubes disposed on a metal oxide layer. In some embodiments, the carbon nanotubes of the ultracapacitor are unzipped to form open graphene structures or graphene nanoribbons. In other embodiments, the ultracapacitor is used in combination with a battery as energy storage unit. In still other embodiments, the carbon nanotubes of the ultracapacitor are disposed upon a metal oxide coating comprised of oxides of titanium, vanadium, iron, nickel, manganese, ruthenium, molybdenum, cobalt, chromium, or combinations thereof.

In some embodiments, the power source is used to charge mobile phones. In other embodiments, the power source is used to charge laptop computers. In other embodiments, the power source is used to charge tablet computers. In still other embodiments, the power source is used to power a light source. In still other embodiments, the light source is a flashlight. In still other embodiments, the power source is used to charge cordless power tools. In still other embodiments, the power source is portable.

In some embodiments, the power source is fully charged in less than 10 minutes. In other embodiments, the power source is fully charged in less than 5 minutes. In still other embodiments, the power source is fully charged in less than 1 minute. In still some embodiments, the charging of the power source is at a power greater than 10 W, greater than 20 W, greater than 30 W, greater than 40 W. In still other embodiments, the charging power of the power source is greater than 50 W. In still other embodiments, the total capacity of the power source is at least 5 mAh or 0.025 Wh.

In some embodiments, the output of the power source is a power plug for charging mobile devices. In other embodiments, the mobile device is a Universal Serial Device and is charged by a Universal Serial Bus. In still other embodiments, the input for the power source is an AC plug. In still other embodiments, the AC plug is connected to a wall mounted electricity outlet.

Figure 9:
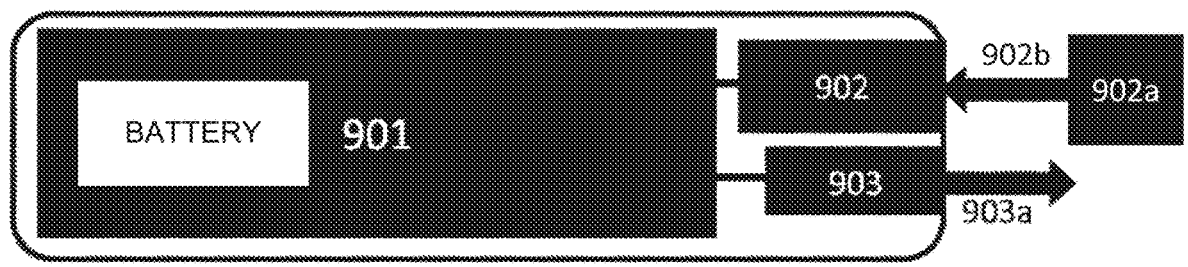
FIG. 9 illustrates a power source a rechargeable, fast-charging, portable power source with ultracapacitors (901) as the energy storage unit. The ultracapacitor portable charger also contains 1) an AC-DC power converter electronics (902) and an input adaptor to an AC wall mounted outlet (902a) and 2) a DC output regulator (903) with a DC adaptor to connect to a mobile device such as a cell phone or laptop computer.

Referring now to FIG. 9, a rechargeable power source with ultracapacitors 901 as the energy storage unit is illustrated. The power source also contains an AC-DC power converter electronics 902, an input AC plug 902b for connecting to AC wall mounted outlet 902a, and a DC output regulator 903 with a DC adaptor 903a which allows for connection to a mobile device such as, for example, a cell phone or laptop computer.

In some embodiments, the rechargeable power source may have either or both the AC-DC power converters electronics and the DC output regulator being separated housing unit(s) than that of the package of the ultracapacitors.

Described below are ultracapacitors which may be used in the rechargeable power sources described herein. In some aspects, a composite structure which includes a metal oxide layer disposed on a metal surface is provided. In some embodiments, the metal surface has a root mean square roughness of less than about 100 nm. In other embodiments, the metal surface includes any metal or any combinations of metals. In other embodiments, the metal surface comprises two or more of iron, nickel, aluminum, cobalt, copper, chromium, gold, and combinations thereof. In still other embodiments, metal surface is laminated on aluminum foils. In still other embodiments, metal surface is laminated on copper foils.

In some aspects, a composite structure which includes a metal oxide layer disposed on a metal surface is provided. In some embodiments, the metal oxide layer includes any elements and combinations thereof that catalyze the growth of carbon nanotubes. In other embodiments, the metal oxide layer comprises oxides of two or more of iron, nickel, aluminum, cobalt, copper, chromium, gold, and combinations thereof. In still other embodiments, the metal oxide layer comprises a catalyst for the growth of carbon nanotubes. In still other embodiments, the metal oxide layer includes particles of iron, nickel, aluminum, cobalt, copper, chromium, gold, and combinations thereof.

In some embodiments, the metal oxide layer is less than about 100 nm thick. In other embodiments, the metal oxide layer is between about 100 nm and about 1 nm thick. In still other embodiments, the metal oxide layer is between about 75 nm and about 4 nm thick. In still other embodiments, the metal oxide layer is between about 50 nm and about 4 nm thick. In still other embodiments, the metal oxide layer is between about 25 nm and about 4 nm thick.

In some embodiments, the metal surface includes any metal or any combinations of metals. In other embodiments, the metal surface includes iron, nickel, aluminum, cobalt, copper, chromium, gold and combinations thereof. In still other embodiments, the metal surface comprises one or more alloys comprised of two or more of iron, nickel, cobalt, copper, chromium, aluminum, and gold. In still other embodiments, the alloy is a complete solid solution alloy. In still other embodiments, the alloy is a partial solid solution alloy. In still other embodiments, the alloy is a substitutional alloy. In still other embodiments, the alloy is an interstitial alloy.

In some embodiments, the metal surface is that of a metal foil and has a surface smoothness where the root mean square roughness is less than about 500 nm. In other embodiments, the root mean square roughness of the metal foil is less than about 200 nm. In still other embodiments, root mean square roughness of the metal foil is between about 2 nm and about 200 nm. In still other embodiments, root mean square roughness of the metal foil is between about 5 nm and about 100 nm.

In some embodiments, the metal foil is less than 500 μm thick. In other embodiments, the metal foil is between about 500 μm and about 10 μm thick. In still other embodiments, the metal foil is between about 400 μm and about 10 μm thick. In still other embodiments, the metal foil is between about 300 μm and about 10 μm thick. In still other embodiments, the metal foil is between about 200 μm and about 10 μm thick. In still other embodiments, the metal foil is between about 100 μm and about 10 μm thick. In still other embodiments, the metal foil is between about 50 μm and about 10 μm thick.

In some embodiments, the metal foil is between about 500 μm and about 1 m thick. In other embodiments, the metal foil is between about 400 μm and about 1 μm thick. In still other embodiments, the metal foil is between about 300 μm and about 1 μm thick. In still other embodiments, the metal foil is between about 200 μm and about 1 μm thick. In still other embodiments, the metal foil is between about 100 μm and about 1 μm thick. In still other embodiments, the metal foil is between about 50 μm and about 1 μm thick.

In some embodiments, the metal foil may be coated with a material that prevents attachment of the metal oxide layer on the metal foil (i.e., a protective coating). In other embodiments, the protective coating may partially cover either side of the metal foil. In still other embodiments, the protective coating completely covers one side of the metal foil and partially covers the other side of the metal foil. In still other embodiments, the protective coating partially covers one side of the metal foil. In still other embodiments, the protective coating completely covers one side of the metal foil. In still other embodiments, neither side of the metal foil is covered by a protective coating. In still other embodiments, the protecting coating provides an area without carbon nanotube for electrical tabs for device integration.

Generally, the metal foil can have any convenient or useful width, length or geometric shape. In some embodiments, the metal foil has a width greater than 1 mm. Generally, the width of the metal foil may be any convenient width useful in a continuous roll-to-roll manufacturing process. In some embodiments, the metal foil has a length greater than 1 mm. In other embodiments, the metal foil has a length greater than 1 m. In still other embodiments, the metal foil has a length greater than 10 m. In still other embodiments, the metal foil has a length greater than 100 m. In still other embodiments, the metal foil has a length greater than 1000 m.

In some embodiments, chemical vapor deposition is used to attach carbon nanotubes to a metal oxide layer disposed on a metal foil in a continuous roll-to-roll manufacturing process. The only requirement for the above is that the length of the metal foil is sufficient for use in a roll-to-roll manufacturing process. Generally, the width and length of the metal foil may be any convenient dimension for use in a continuous roll-to-roll manufacturing process. In some embodiments, the length of the metal foil is greater than 1 meter. In other embodiments, the length of the metal foil is greater than 10 meters. In still other embodiments, the length of the metal foil is greater than 100 meters. In still other embodiments, the length of the metal foil is greater than 1000 meters.

In some embodiments, chemical vapor deposition is used to attach carbon nanotubes to a metal oxide layer disposed on a metal foil in a batch manufacturing process, where one or more metal foil substrates are processed simultaneously. The metal foil may be precut into any geometric form such as a circle, square, rectangle, triangle, pentagon hexagon, etc. or any other form that may be useful.

In some embodiments, chemical vapor deposition is used to attach carbon nanotubes to a metal oxide layer disposed on a metal foil in a continuous in-line manufacturing process, where one or more metal foil substrates are processed sequentially through a processing system with substrates moving linearly or radially through one or more linked processing environments. The metal foil may be precut into any geometric form such as a circle, square, rectangle, triangle, pentagon, hexagon, etc. or any other form that may be useful.

In some embodiments, chemical vapor deposition is used to attach carbon nanotubes to a film stack including a metal oxide layer disposed on a metal foil in a cluster-tool manufacturing process, where a substrate carrier comprising one or more metal foil substrates is processed sequentially in one or more linked processing systems in which a discrete processing step is carried out sequentially on the substrate carrier. The metal foil may be precut into any geometric form such as a circle, square, rectangle, triangle, pentagon, hexagon, etc. or any other form that may be useful.

Figure 2:
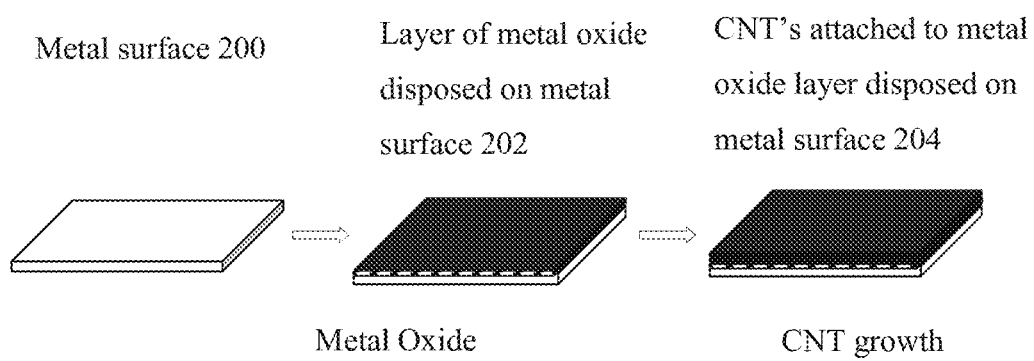
FIG. 2 processing of a composite structure comprising a metal substrate and carbon nanotubes, where the carbon nanotubes are attached to the metal oxide layer disposed on the metal surface.

Referring now to FIG. 1, a composite structure including carbon nanotubes 103 attached to metal oxide layer 102 disposed on metal foil 101 is illustrated from a transmission electron micrograph. Referring now to FIG. 2, processing of a metal surface to an electrode including carbon nanotubes attached to a metal oxide layer disposed on a metal foil is illustrated. Metal surface 200 is processed to metal oxide layer disposed on a metal surface 202 by a variety of processes, supra. Then, carbon nanotubes are attached to metal oxide disposed on a metal surface 202 to provide a composite structure comprising carbon nanotubes attached to a metal oxide layer disposed on a metal foil 204.

A number of methods exist for making a composite structure which comprises carbon nanotubes attached to a metal oxide layer 202 disposed on a metal surface 200. In some embodiments, the metal oxide layer 202 can be deposited on the metal surface 200 by conventional techniques, well known to those of skill in the art, such as physical vapor deposition and chemical vapor deposition.

In some embodiments, the metal surface 200 may be oxidized by a variety of methods to provide a composite structure which includes a metal oxide layer 202 disposed on a metal surface. In some embodiments, the metal surface is oxidized with an oxidizing gas at an elevated temperature. In other embodiments, the oxidizing gas is water vapor, atomic oxygen, diatomic oxygen, ozone, nitric oxide, nitrous oxide, chlorine, fluorine, or combinations thereof. In still other embodiments, the elevated temperature is between about 300° C. and about 1100° C.

In some embodiments, the metal surface 200 is oxidized by exposure of the metal foil to an oxidizing agent in solution. In some embodiments, the metal surface 200 is oxidized with an aqueous solution comprising an oxidizing agent. In other embodiments, the oxidizing agent is a peroxide, hydroperoxide, superoxide, permanganate, chlorate or perchlorate.

In some embodiments, the metal surface 200 is oxidized with plasma. In other embodiments, the plasma is formed from water vapor, atomic oxygen, diatomic oxygen, ozone, nitric oxide, nitrous oxide, chlorine, fluorine, or combinations thereof at an elevated temperature. In still other embodiments, the elevated temperature is between about 25° C. and about 1100° C.

Figure 3:
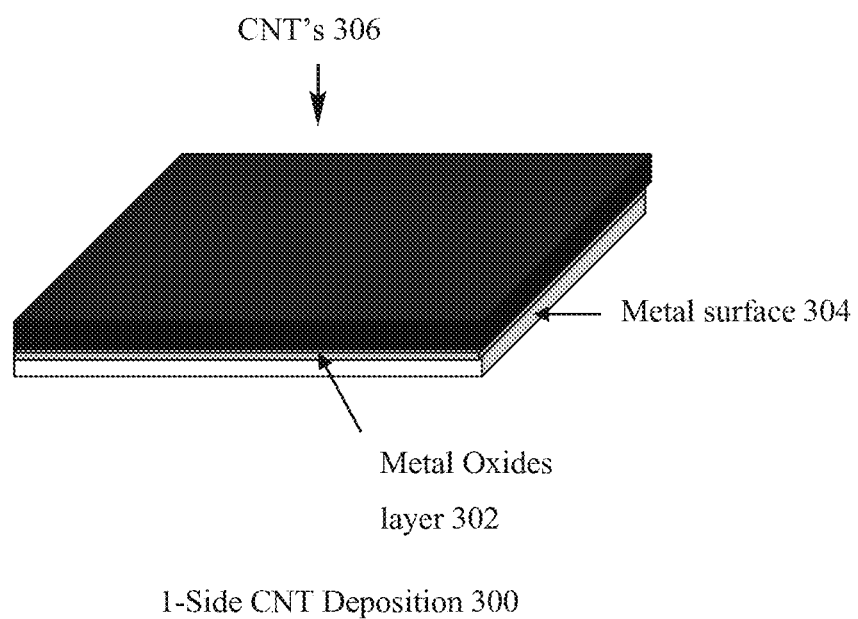
FIG. 3 illustrates one-sided carbon nanotube deposition where carbon nanotubes are attached to a metal oxide layer disposed on one surface of a metal substrate.
Figure 4:
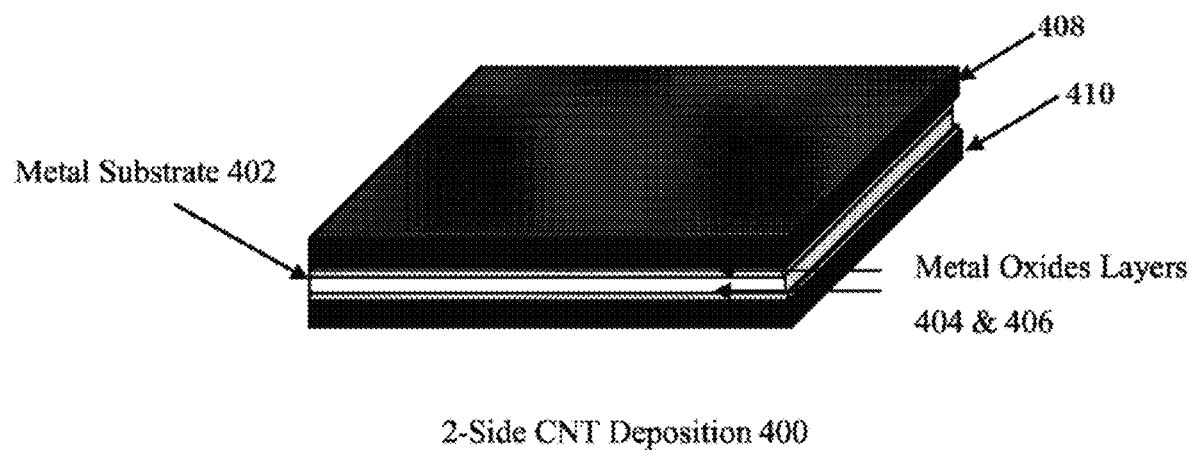
FIG. 4 illustrates two-sided carbon nanotube deposition where carbon nanotubes are attached to metal oxide layers disposed on two surfaces of a metal substrate.

Referring now to FIG. 3, carbon nanotubes 306 are attached to metal oxide layer 304 disposed on metal surface 302 to provide a one-sided carbon nanotube deposition 300. Referring now to FIG. 4, carbon nanotubes 408 and 410 are attached to metal oxide layers 404 and 406 disposed on metal surface 402 to provide a two-sided carbon nanotube deposition 400.

Referring now to FIG. 5 carbon nanotubes 504 are attached to metal oxide layer 506 disposed on metal surface 502 to form a composite structure. As a collective, the carbon nanotubes are highly porous, have a large surface area and high percentage of usable nanopores (i.e., mesopores between about 2 nm to about 50 nm in diameter). Carbon nanotubes are chemically inert and electrically conductive. Carbon nanotubes may be single walled or multi-walled or combinations thereof. Carbon nanostructures useful in the composite structures described herein include other forms such as, for example, toruses, nanobuds and graphenated carbon nanotubes. In some embodiments, the carbon nanotubes are vertically aligned. In other embodiments, the carbon nanotubes are in a vertical tower structure (e.g., perpendicular to the metal foil). Other carbon nanotube configurations include, for example, horizontal or random alignment. In some embodiments, the carbon nanotubes are a random network with a minimal degree of alignment in the vertical direction.

In some embodiments, carbon nanotubes 504 are attached to metal oxide layer 506 by chemical vapor deposition processes. In other embodiments, carbon nanotubes are attached to a metal oxide layer disposed on a metal foil by thermal chemical vapor deposition. In still other embodiments, carbon nanotubes are attached to metal oxide layer disposed on a metal foil by plasma-enhanced chemical vapor deposition.

Thermal chemical vapor deposition of carbon nanotubes is usually performed with hydrocarbon sources (e.g., methane, ethylene, acetylene, camphor, naphthalene, ferrocene, benzene, xylene, ethanol, methanol, cyclohexane, fullerene, etc.), carbon monoxide, or carbon dioxide at temperatures between about 600° C. and 1200° C. preferably, in the absence of oxygen or reduced amounts of oxygen.

Plasma-enhanced chemical vapor deposition of carbon nanotubes is usually performed with hydrocarbon sources, supra. Here, electrical energy rather than thermal energy is used to activate the hydrocarbon to form carbon nanotubes on metal foils at preferred temperatures between about 300° C. and greater than 600° C.

In some embodiments, a portion of the metal oxide layer disposed on a metal surface is pretreated to prevent attachment of carbon nanotubes to that portion of the layer. In other embodiments, a portion of the metal oxide layer disposed on a metal surface is pretreated with a film such as a metal film or an organic (polymer) film that prevents the direct growth of carbon nanotubes in these areas. Films such as those described above can be deposited, for example, by metal evaporation methods (such as thermal ore-beam evaporation) or by ink jet printing to give a desired pattern. Protective films may also be patterned by using a hard mask and/or photolithography techniques.

In some embodiments, plasma treatment (e.g., $F_2$, $NH_3$) of carbon nanotubes surfaces is used to increase surface wettability by increasing the hydrophilicity of the surface. Such treatment enables ions from electrolytes to access the pores of the carbon nanotubes which increase charge density.

Figure 5A:
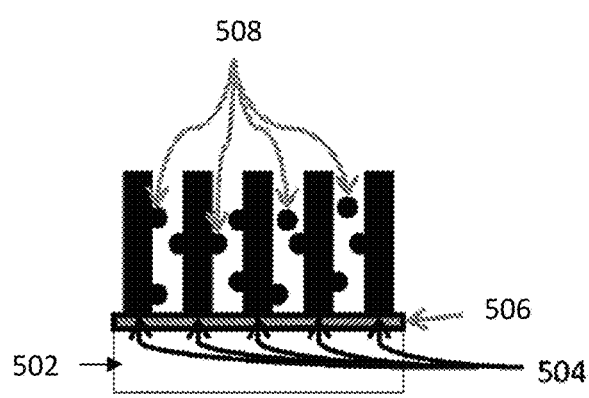
FIG. 5A illustrates carbon nanotubes attached to a metal oxide layer disposed on a metal surface in the presence of amorphous carbon.
Figure 5B:
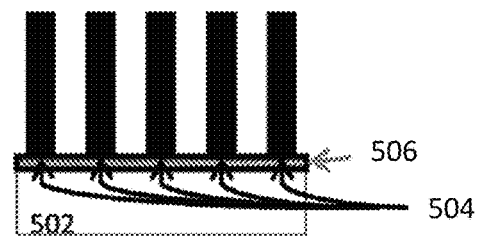
FIG. 5B illustrates carbon nanotubes attached to a metal oxide layer disposed on a metal surface after amorphous carbon has been removed.

Referring to FIG. 5a, during attachment of carbon nanotubes 504 to metal oxide layer 506 disposed on metal surface 502, a side product is amorphous carbon 508. Amorphous carbon reduces the porosity of carbon nanotubes, thus decreasing electrode performance. In some embodiments, selection of hydrocarbon precursors and control of temperature reduces the amount of amorphous carbon formed. Amorphous carbon may be removed by a number of methods including, for example, thermal or plasma cleaning with $O_2$ and exposure to strong acid, halogens and strong oxidants (e.g., $H_2O_2$). In some embodiments, vapor which includes water or $H_2O_2$ or combination thereof may be used to remove amorphous carbon as described by Deziel et al., U.S. Pat. No. 6,972,056. FIG. 5b illustrates carbon nanotubes 504 attached to metal oxide layer 506 disposed on metal surface 502 after amorphous carbon has been removed.

In some embodiments, a continuous water treatment process is used to remove impurities such as amorphous carbon from carbon nanotubes. The process includes a wet inert carrier gas stream (e.g., argon or nitrogen) and may include an additional dry carrier gas stream which is added to adjust water concentration. Water is added using any water infusion method (e.g., bubbler, membrane transfer system, etc.). In some embodiments, water vapor is introduced into a process chamber maintained at between 500° C. and 1200° C. to remove amorphous carbon and other impurities associated with carbon nanotubes attached to a metal oxide layer disposed on a metal foil.

In some embodiments, amorphous carbon is removed in a discrete step after deposition of carbon nanotubes on a metal oxide layer disposed on a metal foil. In other embodiments, amorphous carbon is removed simultaneously during chemical vapor deposition. In still other embodiments, amorphous carbon is removed simultaneously during chemical vapor deposition and also in a discrete second step.

Figure 6:
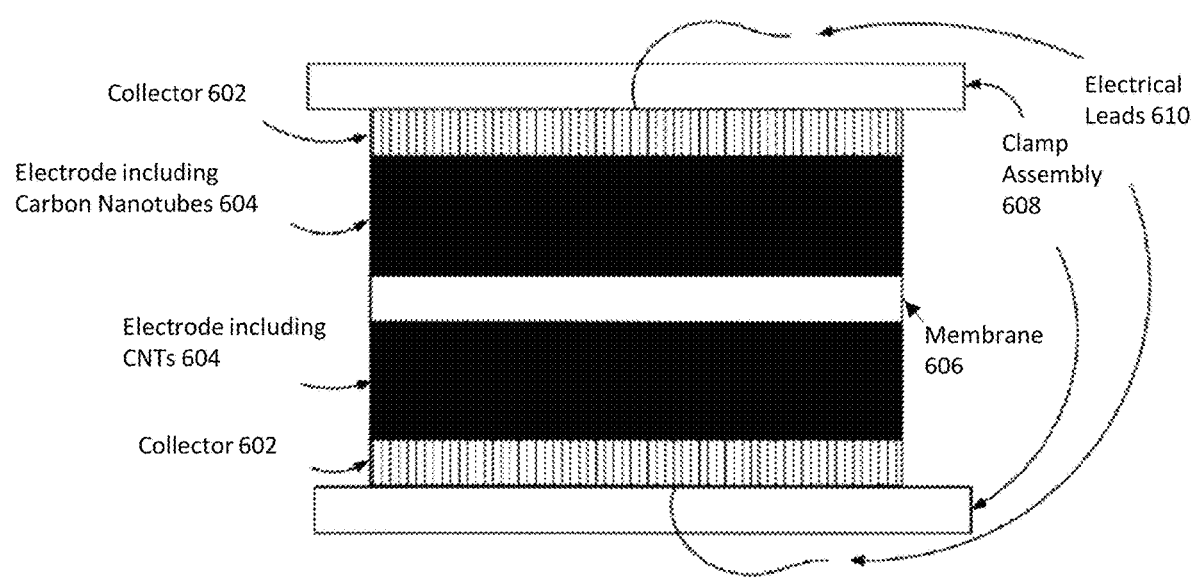
FIG. 6 is a block diagram of an exemplary ultracapacitor comprising composite structures as electrodes.

FIG. 6 is a block diagram of an exemplary ultracapacitor 600, which may be an electrochemical double layer capacitor with an operating voltage of greater than 0.05 volt. Ultracapacitor 600 has two carbon nanotube electrodes 604 separated by an electrolytic membrane 606. In some embodiments, carbon nanotube electrodes 604 may be manufactured in any continuous manufacturing process including roll to roll fashion. In some embodiments, carbon nanotube electrodes 604 may be made with or without removal of amorphous carbon and attached to metal foil which may include catalysts or binders or may not.

Electrical leads 610 (e.g., thin metal wires) contact collectors 602 (e.g., metal foils 602) to make electrical contact. Ultracapacitor 600 is submerged in an electrolyte solution and leads 610 are fed out of the solution to facilitate capacitor operation. Clamp assembly 608 (e.g., coin cells or laminated cells) holds carbon nanotubes 604 attached to metal foil 602 in close proximity while membrane 606 maintain electrode separation (i.e., electrical isolation) and minimizes the volume of ultracapacitor 600.

In some embodiments, ultracapacitor 600 consists of two vertically aligned multi-walled carbon electrode tower electrodes 604 attached to metal foil 602 and an electrolytic membrane 606 (e.g., Celgard or polypropylene) which are immersed in a conventional aqueous electrolyte (e.g., 45% sulfuric acid or KOH). In other embodiments, ultracapacitor 600 consists of two vertically aligned single-walled carbon electrode tower electrodes 604 attached to metal foil 602 and an electrolytic membrane 606 (e.g., Celgard or polypropylene) which are immersed in a conventional aqueous electrolyte (e.g., 45% sulfuric acid or KOH).

In some embodiments, the ultracapacitor is a pseudocapacitor. In some of these embodiments, carbon nanotubes are loaded with oxide particles (e.g., $RuO_2$, $MnO_2$, $Fe_3O_4$, NiO$_2$, MgO$_2$, etc.). In other of these embodiments, carbon nanotubes are coated with electrically conducting polymers (e.g., polypyrrole, polyaniline, polythiophene, etc.). In some embodiments the ultracapacitor is an asymmetrical capacitor (i.e., one electrode is different than the other electrode in the capacitor).

In some embodiments, the ultracapacitors described herein can be stacked to form multiple pairs of electrodes. In other embodiments, the ultracapacitors described herein may be used to form stacked sheets of electrodes.

Figure 7:
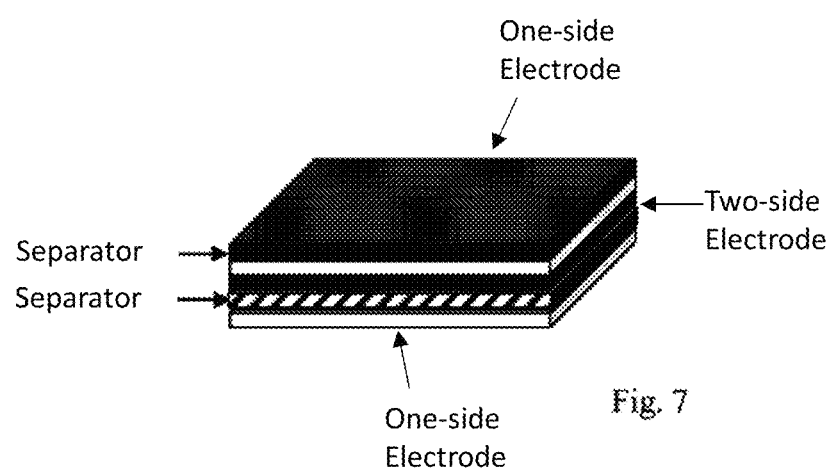
FIG. 7 illustrates an example of an energy storage device composed of a metal substrate with two-sided carbon nanotube deposition. A 3-electrode layer device (two 1-side electrodes on top and bottom and a 2-side electrode sandwiched in the middle) is illustrated. Two separators (dashed) are in between the electrodes. This device is composed of two of 1-side CNT deposited electrode.

Referring now to FIG. 7, an exemplary three electrode layer device is illustrated. The device has two I-side electrodes on the top and bottom with a two side electrode sandwiched in the middle. Two separators, as illustrated, are in between the electrodes.

Figure 8A:
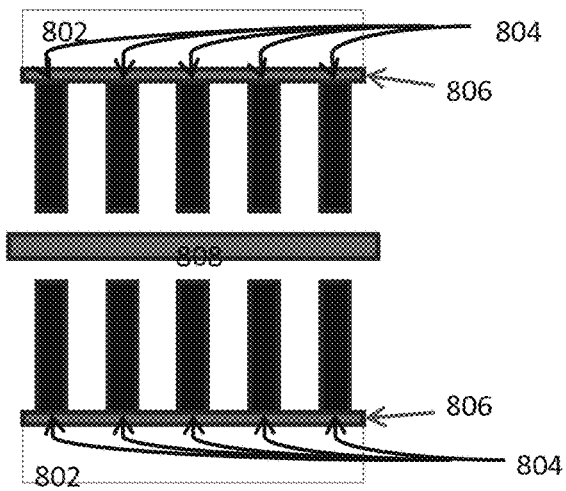
FIG. 8A illustrates coupling of carbon nanotubes attached to a metal oxide layer disposed on a metal surface to a membrane.

Referring now to FIG. 8a, electrodes, which include carbon nanotubes 804 attached to metal oxide layers 806 disposed on metal surface 802 prepared as described, supra, and a membrane 808 is selected. Membrane 808 is a porous separator such as, for example, polypropylene, Nafion, Celgard, Celgard 3400 glass fibers or cellulose. The electrodes, which include carbon nanotubes 804 attached to metal oxide layers 806 disposed on metal surface 802 are coupled to membrane 808 by a clamp assembly.

Figure 8B:
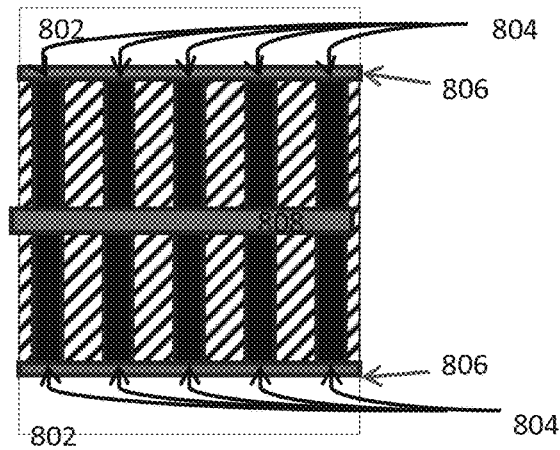
FIG. 8B illustrates submersion in electrolyte solution of carbon nanotubes attached to a metal oxide layer disposed on a metal surface to a membrane.

Referring now to FIG. 8b, carbon nanotubes 804 attached to metal oxide layer 806 disposed on metal surface 802 and coupled to membrane 808 are immersed in electrolyte (shaded portion of Figure) which may be a liquid or gel. In some embodiments, carbon nanotubes 804 may be suffused with a gas or combinations thereof including air. Alternatively, in some embodiments the space around carbon nanotubes 804 may be evacuated by a vacuum source. In some embodiments, electrolytes include, for example, aqueous electrolytes (e.g., sodium sulfate, magnesium sulfate, potassium chloride, sulfuric acid, magnesium chloride, etc.), organic solvents (e.g., acetonitrile, propylene carbonate, tetrahydrofuran, γ-gamma butryolactone, etc.), ionic liquids (e.g., 1-ethyl-3-methylimidazolium bis(pentafluoroethylsulfonyl)imide, etc.), electrolyte salts soluble in organic solvents, (tetralkylammonium salts (e.g., $(C_2H_5)_4NBF_4$, $(C_2H_5)_3CH_3NBF_4$, $(C_4H_9)_4NBF_4$, $(C_2H_5)_4NPF_6$, etc.) tetralkylphosphonium salts (e.g., $(C_2H_5)_4PBF_4$, $(C_3H_7)_4PBF_4$, $(C_4H_9)_4PBF_4$, etc.), lithium salts (e.g., $LiBF_4$, $LiPF_6$, $LiCF_3SO_3$, etc., N-alkyl-pyridinium salts, 1,3 bisalkyl imidazolium salts, etc.), etc.

The composite structures comprising carbon nanotubes described herein may be used in a wide variety of devices. Carbon nanotubes may be used as electrodes for ultracapacitors, or lithium ion batteries. In addition carbon nanotubes may be used in methane and hydrogen storage, solar cells, electrocatalysts, and catalysts supports for fuel cells, and porous carbon for lithium sulfur and lithium oxygen batteries.

Ultracapacitors which include carbon nanotubes described herein may be used in a wide variety of applications, such as for example, electric transportation technology, (e.g., electric vehicles, electric hybrid vehicles, micro hybrids, catalytic converter preheater, etc.), electric utility industry (e.g., emergency backup power system, grid system stability improvement system, charging devices, smart grids, etc.) consumer electronics, (e.g., cellular telephones, cameras, computers, pagers, copy machines, amplifiers, etc.) batteries (e.g., lithium, magnesium, aluminum, lead, mercury, iron, cadmium, nickel batteries, etc.) medical electronics (e.g., defibrillators, drug delivery units, neurological stimulators, etc.), military devices (e.g., missiles, aerial vehicles, communication devices, etc.) etc.

Finally, it should be noted that there are alternative ways of implementing the present invention. Accordingly, the present embodiments are to be considered as illustrative and not restrictive, and the invention is not to be limited to the details given herein, but may be modified within the scope and equivalents of the appended claims.

All publications and patents cited herein are incorporated by reference in their entirety.

The invention claimed is:

1. A portable rechargeable power source for charging mobile devices, wherein the power source is fully charged in less than 10 minutes, the power source comprising an AC-DC power converter and an energy storage unit comprised of a battery and an ultracapacitor wherein the ultracapacitor has a composite structure comprising:
a metal foil current collector with thickness of less than 500 μm and a root mean square roughness in the range 2 to 200 nm;
a metal oxide layer less than 100 nm thick disposed on a surface of the metal foil and including one or more atoms of iron, nickel, aluminium, cobalt, copper, chromium and gold metal atoms or alloys thereof;
carbon nanotubes disposed on at least part of the metal oxide layer and which have been plasma treated to increase surface wettability, and wherein the carbon nanotubes comprise mesopores in the diameter range of from 2 nm to 50 nm, wherein the carbon nanotubes have been unzipped to create open graphene structures or carbon nanoribbons, and wherein the carbon nanotubes are coated with an electrically conducting polymer; and
an electrolyte comprising an ionic liquid comprising pyridinium salts, imidazolium salts, or a combination thereof.

2. The power source of claim 1 wherein the carbon nanotubes have also been water treated to remove impurities.

3. The power source of claim 1 wherein the carbon nanotubes are free from amorphous carbon impurities.

4. The power source of claim 1 wherein those parts of the metal oxide layer free from carbon nanotubes are coated with a metal or organic polymer film which prevents direct growth of the carbon nanotubes thereon.

5. The power source of claim 1 wherein the carbon nanotubes are coated with particles of one or more oxides of ruthenium, manganese, iron, nickel and magnesium.

6. The power source of claim 1, wherein the power source is fully charged in less than 5 minutes.

7. The power source of claim 1, wherein the power source is fully charged in less than 1 minute.

8. The power source of claim 1, wherein the total capacity of the power source is at least 5 mAh or 0.025 Wh.

9. The power source of claim 1, wherein the mobile device is a Universal Serial Device and is charged by a Universal Serial Bus.

10. The power source of claim 1, wherein the input for the power source is an AC plug.

11. The power source of claim 10, wherein the AC plug is connected to a wall mounted electricity outlet.

12. The power source of claim 1, wherein the power source is charged at greater than 20_W.

13. The power source of claim 1, wherein the power source is charged at greater than 50_W.

14. The power source of claim 1, wherein the power source is used to charge mobile phones.

15. The power source of claim 1, wherein the power source is used to charge laptop computers.

16. The power source of claim 1, wherein the power source is used to power a light source.

17. The power source of claim 1, wherein the power source is used to charge cordless power tools.

18. The power source of claim 1, wherein the ultracapacitor energy storage unit comprises multiple pairs of stacked electrodes.

19. The power source of claim 1, wherein the electrolyte is in the form of a liquid or a gel.

20. The power source of claim 1, wherein the electrolyte is selected from the group consisting of N-alkyl-pyridinium salts, 1, 3-bisalkyl-imidazolium salts, and a combination thereof.

21. The power source of claim 1, wherein the ultracapacitor further comprises an electrolytic membrane.

22. The power source of claim 1, wherein the ultracapacitor is an asymmetrical capacitor.

* * * * *